(12) United States Patent
Kawasaki

(10) Patent No.: US 7,530,514 B2
(45) Date of Patent: May 12, 2009

(54) FISHING COMPONENT

(75) Inventor: Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/590,821

(22) Filed: Nov. 1, 2006

(65) Prior Publication Data

US 2007/0181728 A1    Aug. 9, 2007

(30) Foreign Application Priority Data

Dec. 9, 2005  (JP)  ............... 2005-356547

(51) Int. Cl.
*A01K 89/01* (2006.01)
(52) U.S. Cl. ..................... 242/310; 428/334
(58) Field of Classification Search ............... 242/310, 242/311, 249, 223; 74/467, 468, 457, 460; 29/893, 893.1, 893.37; 428/334, 471.1
See application file for complete search history.

(56) References Cited

U.S. PATENT DOCUMENTS 4,943,486 A * 7/1990 Uchiyama .................. 428/469
5,203,224 A * 4/1993 Honda ....................... 74/468
7,051,965 B2 * 5/2006 Nishimura ................. 242/310
2005/0133651 A1 * 6/2005 Cheung ...................... 242/263

FOREIGN PATENT DOCUMENTS

JP    2001-73165 A    3/2001
JP    2001-321036     11/2001

* cited by examiner

*Primary Examiner*—Emmanuel M Marcelo
(74) *Attorney, Agent, or Firm*—Shinjyu Global IP

(57) ABSTRACT

A fishing component for preventing corrosion in a fishing reel includes a first component body that composes a portion of a reel unit of the fishing reel and a second component body that composes a clutch control mechanism of the fishing reel. The first component body is made of a magnesium alloy and the second component body is made of a stainless steel alloy. An anodic oxide film layer is provided on a surface layer side of the first component body. A first insulating film layer is formed on a surface layer side of the anodic oxide film layer. A second insulating film layer is formed on a surface layer side of the second component body.

8 Claims, 15 Drawing Sheets

FISHING COMPONENT

CROSS-REFERENCE TO RELATED APPLICATIONS

This application claims priority under 35 U.S.C. § 119 to Japanese Patent Application No. 2005-356547 filed on Dec. 9, 2005. The entire disclosure of Japanese Patent Application No. 2005-356547 is hereby incorporated herein by reference.

BACKGROUND OF THE INVENTION

1. Field of the Invention

The present invention generally relates to a fishing component. More specifically, the present invention relates to a fishing component used for fishing.

2. Background Information

It is known that paint films are formed onto an obverse face of components used in fishing equipment, such as reels, which are used outdoors. In particular, paint films are formed on components used in fishing equipment made of magnesium alloy. Forming such paint films will prevent the components made of magnesium alloy from being directly exposed in corrosive atmospheres, thereby improving the corrosion resistance.

In addition, if a conducting liquid such as saltwater seeps between a component made of magnesium alloy and a component made of other metal such as stainless steel alloy, localized electric cells are formed due to the difference in ionization tendency between magnesium alloy and other metals. In this case, the component made of magnesium alloy may be subjected to galvanic corrosion.

To solve such a defect, it is known to form an insulating film layer on a surface of a component made of magnesium alloy (see, for example, Japanese Patent Publication No. 2001-073165). Since the magnesium alloy is not exposed on a surface layer side by forming this type of insulating film layer, localized electric cells are less prone to be formed between a component made of magnesium alloy and a component made of other metals. In this case, it is possible to prevent galvanic corrosion on the component made of magnesium alloy.

However, in the case where the component made of magnesium alloy has a complex shape, it is very difficult to form a uniform insulating film layer on the whole surface of the component; particularly in the case where the magnesium alloy component has a pinhole or the like (an example of a poor insulating portion) formed on a part of the surface of the component. If a conducting liquid such as saltwater seeps between the magnesium alloy component having a pinhole and a component made of other metals, localized electric cells are formed due to the difference in ionization tendency between the magnesium alloy and the other metal. In this case, the component body made of a magnesium alloy may be subjected to galvanic corrosion.

In view of the above, it will be apparent to those skilled in the art from this disclosure that there exists a need for an improved fishing component that reliably prevents galvanic corrosion on a magnesium alloy component. This invention addresses this need in the art as well as other needs, which will become apparent to those skilled in the art from this disclosure.

SUMMARY OF THE INVENTION

A fishing component according to a first aspect of the present invention is a fishing component including a first component body, a second component body, and an insulating film layer. The first component body is made of a magnesium alloy. The second component body is made of a stainless steel alloy and is opposed to the first component body. The insulating film layer is formed on a surface layer side of the second component body.

In this fishing component, the second component body made of stainless steel alloy is opposed to the first component body made of magnesium alloy, and the insulating film layer is formed on the second component body made of stainless steel alloy. In this configuration, since the insulating film layer is formed on the second component body made of stainless alloy, even if a part of the magnesium alloy is exposed on the surface layer side due to a pinhole, or the like, the insulating film layer formed on the second component body prevents exposure of the stainless steel alloy on the surface layer side unlike the prior art. For this reason, even if a conducting liquid such as saltwater seeps between the first component body made of magnesium alloy and the second component body made of stainless steel alloy, no localized electric cell is formed between the magnesium alloy and the stainless alloy. Therefore, it is possible to reliably prevent galvanic corrosion on the component body made of magnesium alloy.

The fishing component pertaining to a second aspect of the present invention is the fishing component according to the first aspect further comprising an insulating film layer that is formed on the surface layer side of the first component body. In this configuration, the insulating film layer is formed on the first component body made of magnesium alloy, and the insulating film layer is formed on the second component body made of stainless steel alloy. Therefore, forming the insulating film layers on the surfaces of both the materials can more reliably prevent galvanic corrosion on the component body made of magnesium alloy.

The fishing component pertaining to a third aspect of the present invention is the fishing component according to the first aspect further comprising an anodic oxide film layer that is formed on the surface layer side of the first component body. In this configuration, since the electrical resistance of an anodic oxide film layer is generally high, it is possible to further improve the resistance to corrosion and abrasion of the component body.

The fishing component pertaining to a fourth aspect of the present invention is the fishing component according to the third aspect further comprising an insulating film layer that is formed on the surface layer side of the anodic oxide film layer. In this configuration, since the anodic oxide film layer and the insulating layer are formed on the surface layer side of the first component body in this order, because of a plurality of film layers, the component body made of magnesium alloy is less prone to be exposed on the surface layer side.

The fishing component pertaining to a fifth aspect of the present invention is the fishing component according to any of the first through fourth aspects of the present invention, wherein the insulating film layer(s) is/are formed by electrodeposition. In this configuration, since the insulating film layer(s) is/are formed by electrodeposition, a uniform painting film(s) can be formed. Additionally, in the case where a polyamine resin, as a base resin of a cationic electrodeposition paint, or the like is used, for example, it is possible to improve rust-preventive properties of the component body.

The fishing component pertaining to a sixth aspect of the present invention is the fishing component according to any of the first through fifth aspects, wherein the first component body is used in a reel unit of a fishing reel. The second component body is used in an internal component disposed inside the reel unit. In this configuration, in a reel unit of a fishing reel and in internal components thereof, which are often used outdoors in corrosive atmospheres, it is possible to reliably prevent galvanic corrosion between the reel unit made of magnesium alloy and the internal component made of stainless steel alloy.

The fishing component pertaining to a seventh aspect of the present invention is the fishing component according to the sixth aspect, wherein the internal component is a member that composes a clutch mechanism of the fishing reel. In this configuration, members, such as clutch plate, clutch pawl for clutch disengagement, ratchet wheel, clutch cam, clutch cam stopper and clutch yoke, that compose the clutch mechanism are made of stainless steel, therefore, it is possible to maintain high the strength of the members that compose the clutch mechanism, and additionally to prevent galvanic corrosion between the reel unit made of magnesium alloy and the members that compose the clutch mechanism made of stainless steel.

With the present invention, in a fishing component, a second component body made of stainless steel alloy is opposed to a first component body made of magnesium alloy, and an insulating film layer is formed on the second component body made of stainless steel alloy, therefore, it is possible to reliably prevent galvanic corrosion on the component body made of magnesium alloy.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
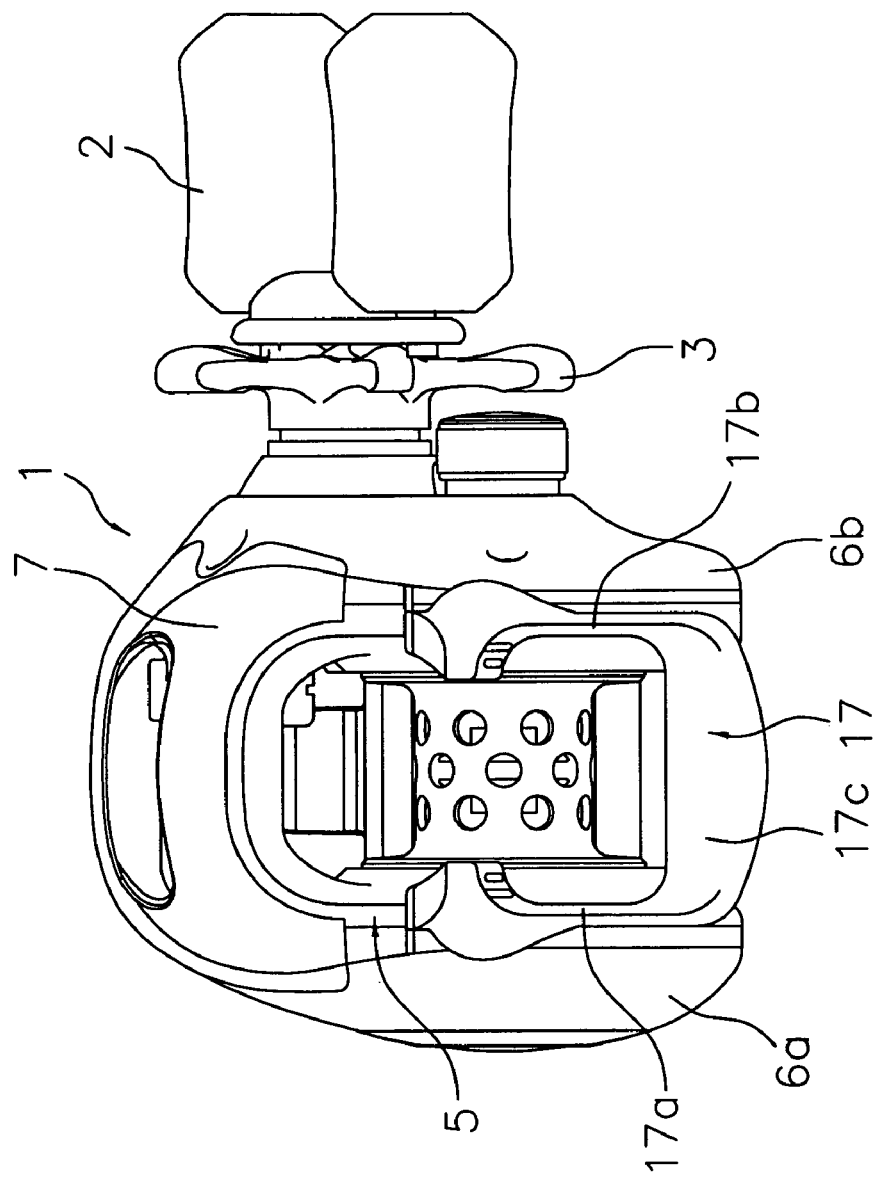
FIG. 1 is a plan view of a dual-bearing reel equipped with a fishing component in accordance with a first embodiment of the present invention.

Referring initially to FIG. 1, a dual bearing reel equipped with a fishing component according to a preferred embodiment of the present invention is illustrated. The dual bearing reel includes a reel unit 1 configured to be attached to a fishing rod, a spool 15, a handle 2 for rotating the spool 15 that is disposed on one side of the reel unit 1 and a star drag 3 for adjusting the drag that is disposed on the reel unit 1 side of the handle 2.

Figure 2:
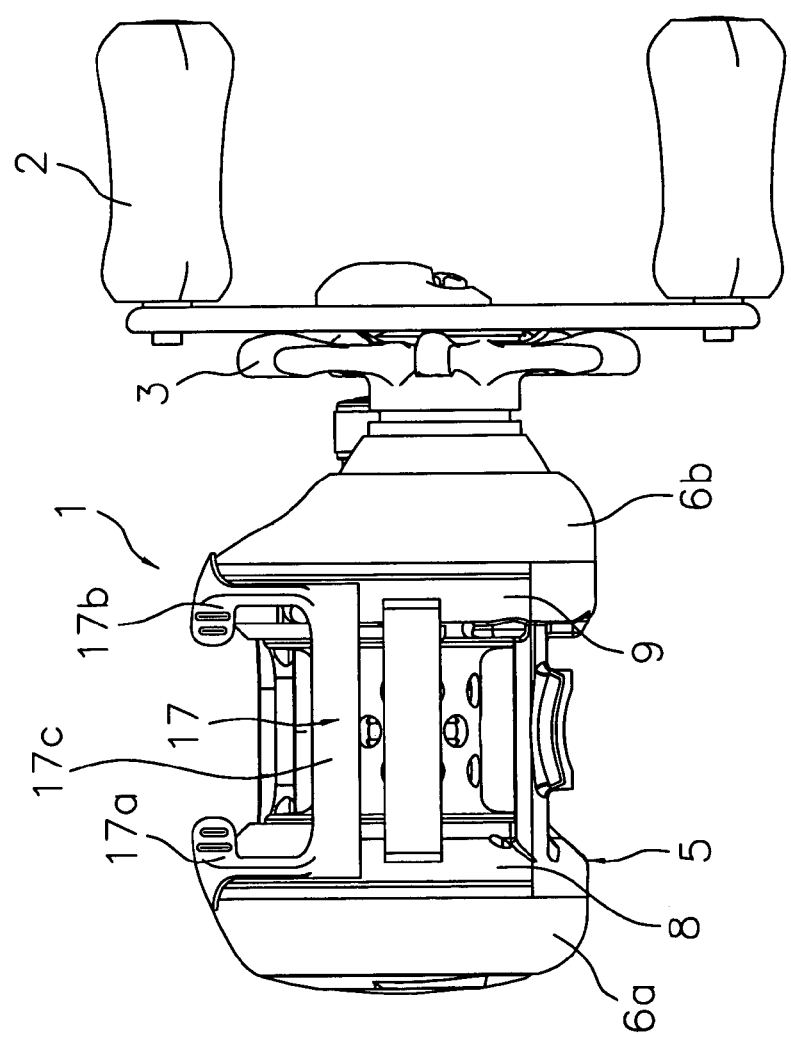
FIG. 2 is a rear plan view of the dual-bearing reel of FIG. 1 equipped with the fishing component in accordance with the first embodiment of the present invention.
Figure 3:
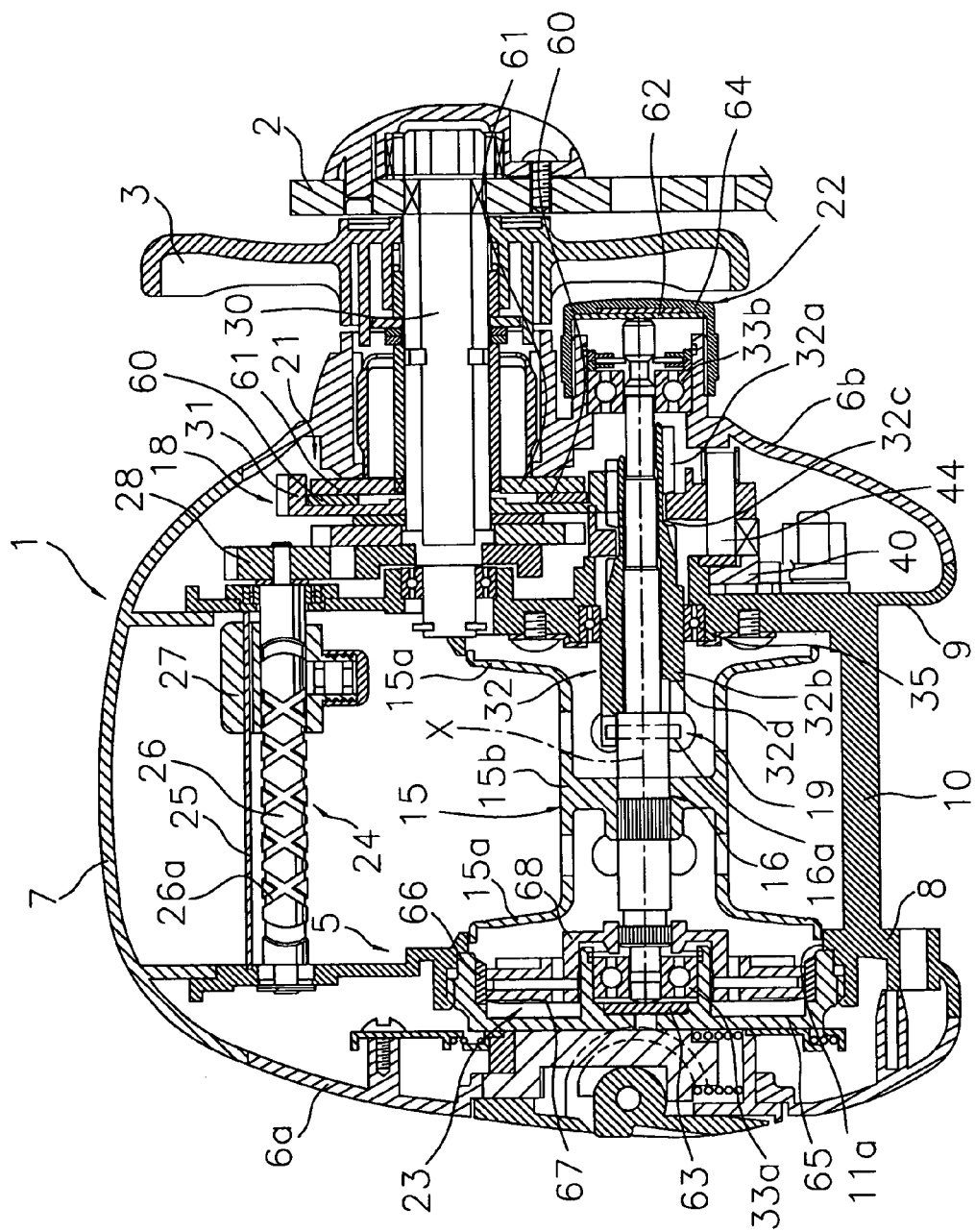
FIG. 3 is a cross-sectional view of the dual-bearing reel of FIG. 1 equipped with the fishing component in accordance with the first embodiment of the present invention.

Referring to FIGS. 1-3, the reel unit 1 further includes a frame 5, first and second side covers 6a and 6b and a front cover 7. The first and second side covers 6a and 6b are mounted to opposing sides of the frame 5. The frame 5 includes a first side plate 8, a second side plate 9 and a plurality of connectors 10 that connect the first side plate 8 and second side plate 9. The first and second side plates 8 and 9 are disposed so as to face each other across a predetermined gap.

A plurality of members of the reel unit 1, such as the first and second side plates 8 and 9 of the frame 5 and the connectors 10 (examples of a first component body), for example, are made of a magnesium alloy. Surfaces of the members are subjected to various surface treatments.

Next, a detailed explanation will be made of the obverse structure of the parts composing the reel body 1.

Figure 8:
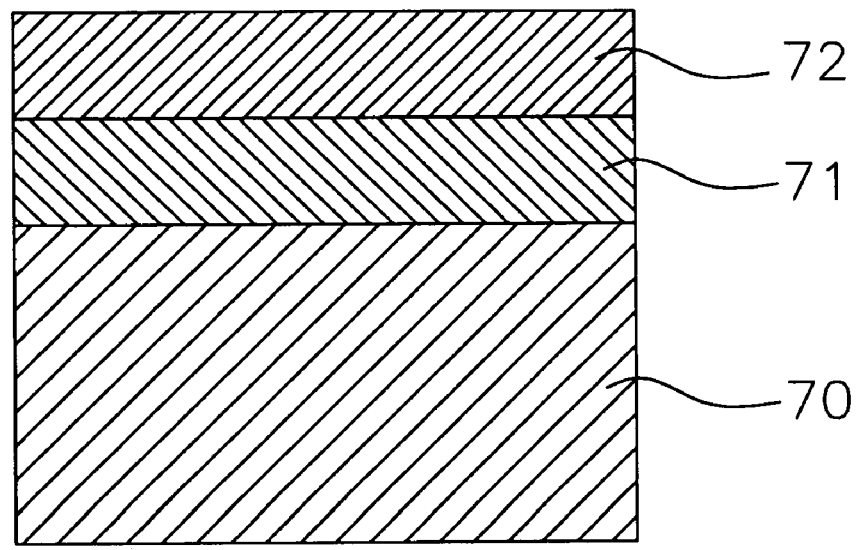
FIG. 8 is a schematic cross-sectional view of a first component body of the fishing component in accordance with the first embodiment of the present invention.
Figure 9:
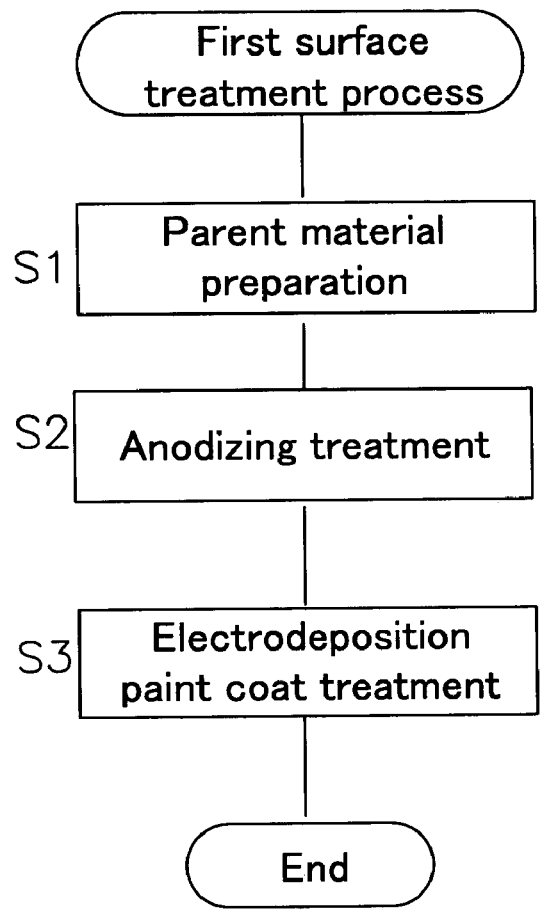
FIG. 9 is a diagram of surface treatment processes of the first component body of the fishing component of FIG. 8 in accordance with the first embodiment of the present invention.

Referring to FIGS. 8 and 9, a parent material that will become a first component body 70 made of the magnesium alloy in each of the members is prepared (S1 in FIG. 9). An anodic oxide film layer 71 is formed on a surface layer side of the first component body 70 by an anodizing treatment (S2 in FIG. 9). A first insulating film layer 72 is formed on a surface layer side of the anodic oxide film layer 71 by an electrodeposition paint treatment (S3 in FIG. 9).

The anodic oxide film layer 71 is a ground coating for making a satisfactory adhesiveness of the paint on a layer side obverse to the anodic oxide film layer 71. Taking the first component body 70 as the anode, the anodic oxide film layer 71 is galvanically decomposed in a solution of sulfuric acid, oxalic acid or chromic acid. Accordingly, a film is formed due to oxygen generated at the anode. The electrical resistance of this anodic oxide film layer 71 is high and its resistance to corrosion and abrasion is excellent.

The first insulating film layer 72 is formed by electrodeposition using a cationic electrodeposition paint, which has a main component of a polyamine resin. To carry out the electrodeposition, the first component body 70, which has been coated with the anodic oxide film layer 71, is immersed in a bath of the electrodeposition paint. Then, taking the first component body 70 as the cathode and an electrode arranged in the bath of the electrodeposition paint as the anode, the first component body 70 is galvanically coated with the paint by applying a dc voltage. Since the first insulating film layer 72 is formed in this way by an electrodeposition paint coat method, it is possible to improve rust-preventive properties. In addition, it is possible to facilitate bonding the first insulating film layer 72 uniformly onto the surface of the anodic oxide film layer 71.

Figure 4:
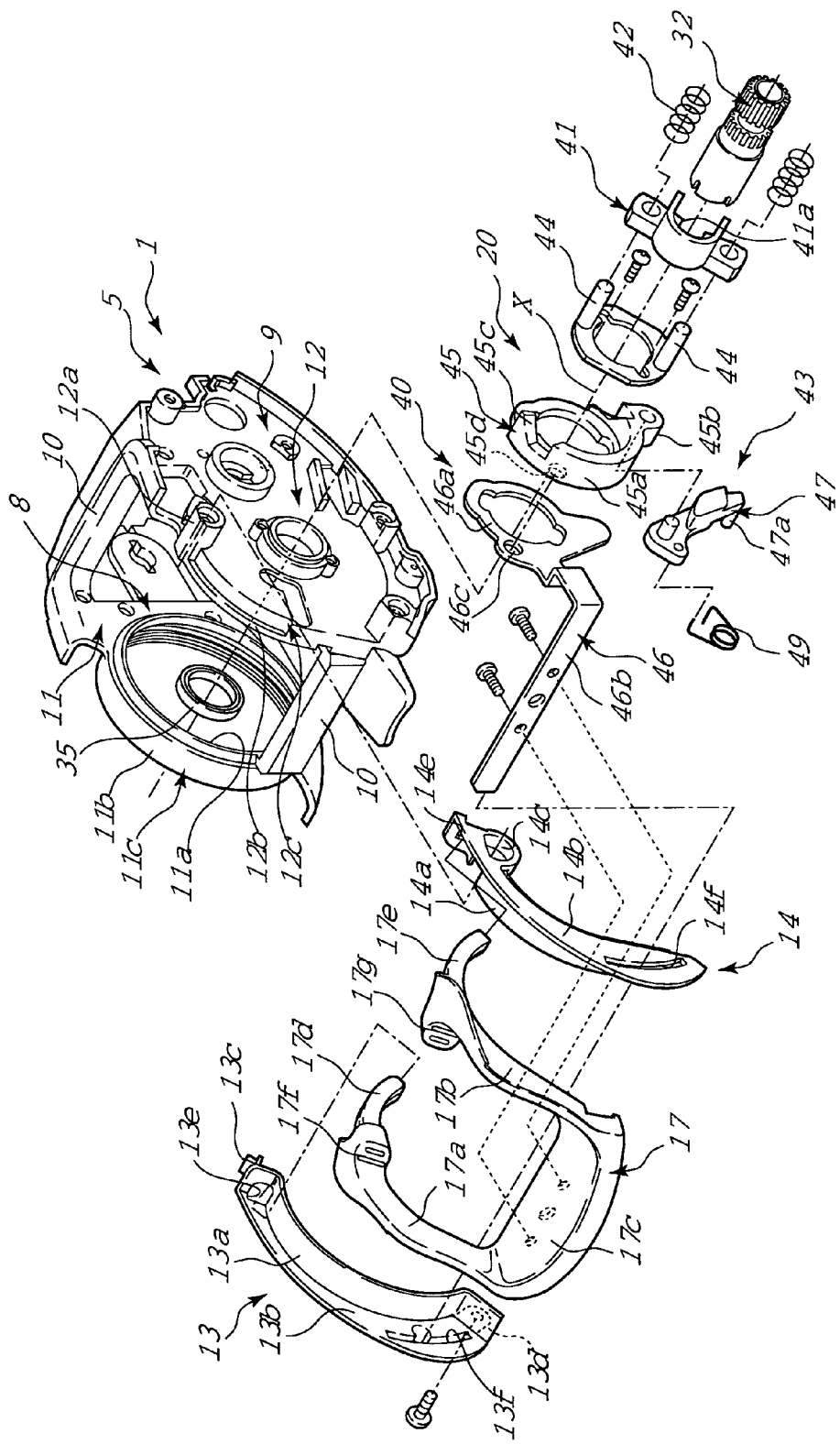
FIG. 4 is an exploded oblique view of parts related to a clutch of the dual bearing reel equipped with the fishing component in accordance with the first embodiment of the present invention.

As shown in FIG. 4, the first and second side plates 8 and 9 have first and second side plate bodies 11 and 12, respectively, and first and second movement support portions 13 and 14, respectively. The first and second movement support portions 13 and 14 are removably/reattachably attached to the first and second side plate bodies 11 and 12, respectively. The first and second movement support portions 13 and 14 slidably support a clutch operating member 17. The first side plate body 11 is a substantially plate-shaped member having a circular female threaded opening 11a, a plurality of arc-shaped surfaces 11b and a plurality of cutout portions 11c. The female threaded opening 11a is for detaching the spool 15 that is formed at the rear thereof. A brake case 65 in the reel unit 1 is removably/reattachably screwed into the female threaded opening 11a.

Figure 5:
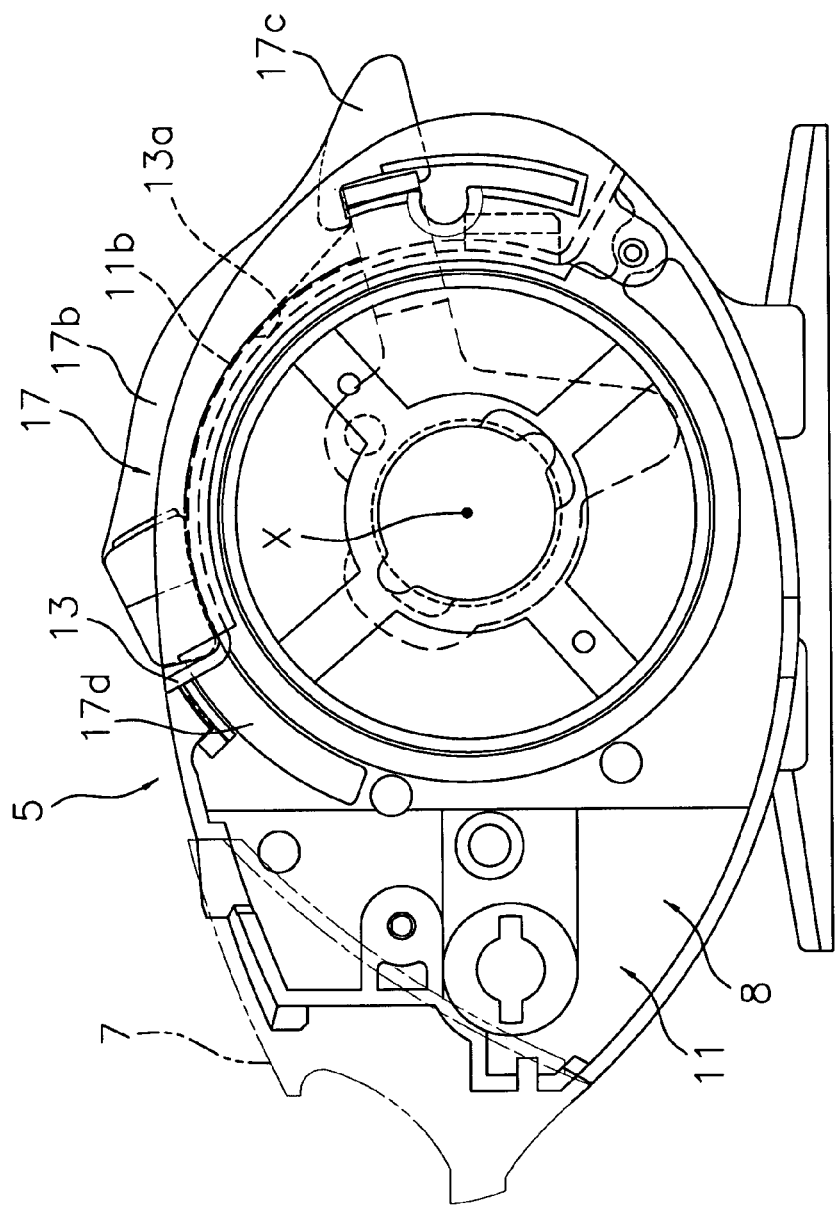
FIG. 5 is a first side view with a first side cover being removed and with the clutch in a clutch-on state in accordance with the first embodiment of the present invention.
Figure 6:
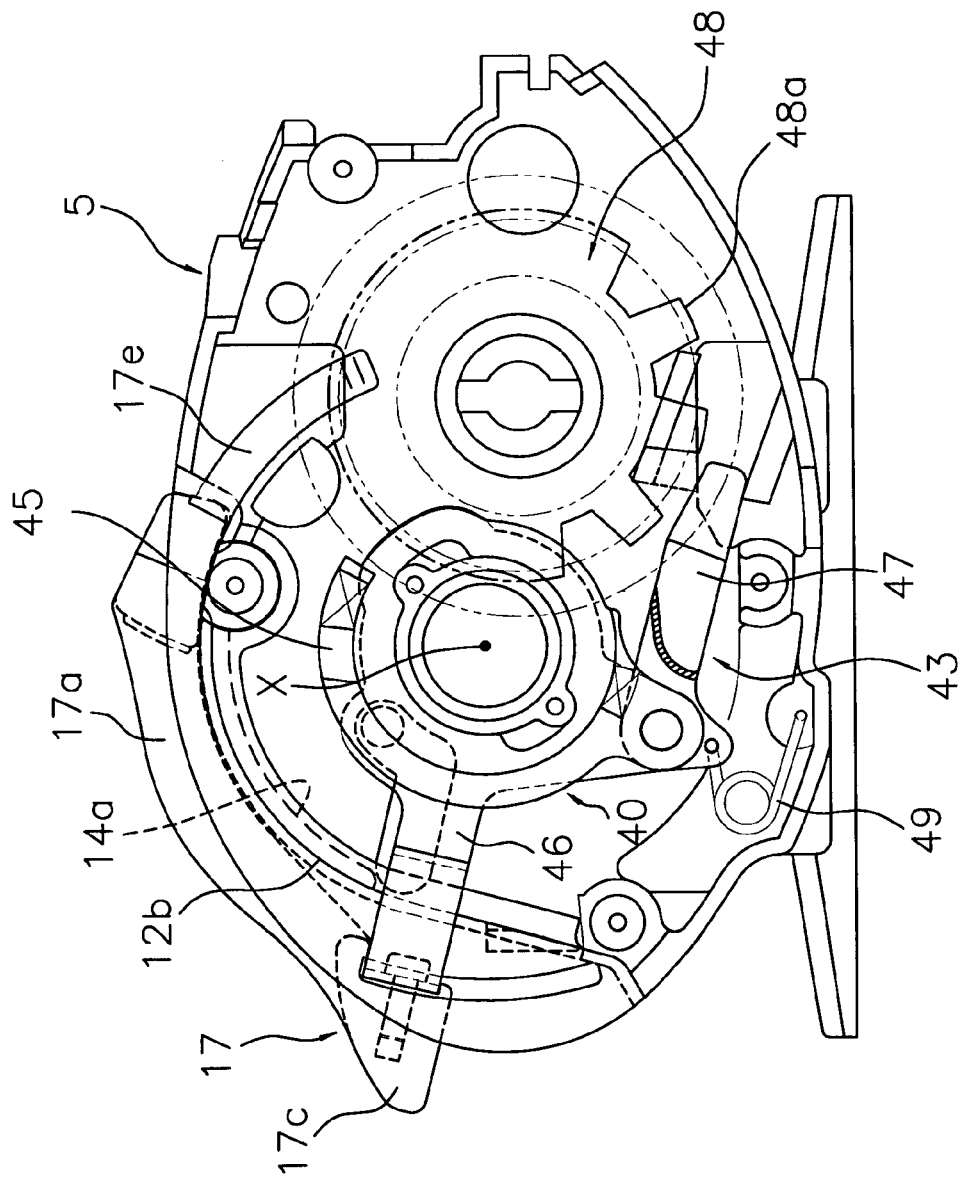
FIG. 6 is a second side view with a second side cover being removed and with the clutch in a clutch-on state in accordance with the first embodiment of the present invention.

The second side plate body 12 has a circular opening 12a, a plurality of arc-shaped surfaces 12b and a plurality of cutout portions 12c. The cutout portions 11c and 12c are disposed at a rear of the first and second side plate bodies 11 and 12, respectively. Referring to FIGS. 4-6, the arc-shaped surfaces 11b and 12b are formed at least partially in the cutout portions 11c and 12c. The first and second movement support portions 13 and 14 are fastened with screws to the cutout portions 11c and 12c.

The first and second movement support portions 13 and 14 are made of synthetic resin, for example, and have attachment sections 13a and 14a, respectively and plate-shaped sections 13b and 14b, respectively. The attachment sections 13a and 14a have arc-shaped surfaces that are at least partially formed in close contact with the arc-shaped surfaces 11b and 12b, respectively. The plate-shaped sections 13b and 14b are arranged flush with the first and second side plate bodies 11 and 12. The clutch operating member 17 slides on the attachment sections 13a and 14a.

The first movement support portion 13 includes an interlock section 13c, a screwed section 13d, an opening 13e and an arc-shaped slit 13f. The interlock section 13c is formed protruding at a fore end of the first movement support portion 13. The screwed section 13d is formed at a base end of the first movement support portion 13. The interlocking section 13c is interlocked with an outside surface of the first side plate body 11. The screwed section 13d is fastened to the outside surface of the first side plate body 11 with a screw. The opening 13e is formed at the fore end of the first movement support portion 13. The arc-shaped slit 13f is formed on a base side of the plate-shaped section 13b. A part of the clutch operating member 17 passes through the opening 13e.

The second movement support portion 14 includes an interlock hole 14c, an opening 14e and an arc-shaped slit 14f. The interlock hole 14c is formed at a fore end of the second movement support portion 14. The second movement support portion 14 is non-rotatably interlocked with a boss section 12d that is formed on the outside surface of the second side plate body 12. The opening 14e is formed at the fore end of the second movement support portion 14. The arc-shaped slit 14f is formed on a base side of the plate-shaped section 14b. A part of the clutch operating member 17 passes through the opening 14e.

As shown in FIGS. 3 and 4, the double-sided frame 5 accommodates the spool 15, a level wind mechanism 24, the clutch operating member 17 and a clutch mechanism 19. The spool 15 is disposed between the first and second side plates 8 and 9. The level wind mechanism 24 uniformly winds fishing line on the spool 15. The clutch operating member 17 also serves as a thumb rest for a fisherman's thumb while thumbing the line. The clutch operating member 17 is rotatably mounted about a spool shaft 16 at the rear of the reel unit 1. The clutch mechanism 19 connects/disconnects the rotational force between the handle 2 and the spool 15.

In addition, a rotation transmission mechanism 18, a clutch control mechanism 20, a drag mechanism 21, and a casting control mechanism 22 are disposed in the space between the frame 5 and the second side cover 6b. The rotation transmission mechanism 18 transmits the rotational force from the handle 2 to the spool 15 and the level wind mechanism 24. The clutch control mechanism 20 controls the clutch mechanism 19 in accordance with the operation of the clutch operating member 17. The casting control mechanism 22 serves to adjust the resistance that occurs when the spool 15 rotates. Additionally, a centrifugal braking mechanism 23 for preventing backlash when casting is disposed between the frame 5 and the first side cover 6a.

The spool 15 has flange portions 15a at both ends and a bobbin trunk portion 15b in between the flange portions 15a. The spool 15 is fixed to the spool shaft 16. The spool shaft 16 passes through a center of the spool 15. Both ends of the spool shaft 16 are rotatably supported to the frame 5 by a pair of bearings 33a and 33b. An end of the spool shaft 16 passes through the second side cover 6b to protrude and extend from the second side cover 6b.

Referring to FIG. 3, the rotation transmission mechanism 18 includes a master gear 31, a pinion gear 32 and a worm shaft gear 28. The master gear 31 is rotatably mounted on a handle shaft 30. The pinion gear 32 meshes with the master gear 31. The pinion gear 32 has a plurality of gear teeth 32a, an engagement portion 32b and a constricted portion 32c. The gear teeth 32a are formed on an outer peripheral portion of the pinion gear 32 on an end thereof. The engagement portion 32b is formed on the other end surface of the pinion gear 32. The constricted portion 32c is formed between the gear teeth 32a and the engagement portion 32b. The engagement portion 32b has an engagement groove 32d that is formed on a diameter of the other end surface of the pinion gear 32. The engagement groove 32d is able to be engaged with or disengaged from an engagement pin 16a that is attached to the spool shaft 16. In addition, an outer peripheral surface of the engagement portion 32b is rotatably supported on the second side plate 9 by a bearing 35.

The engagement groove 32d of the engagement portion 32b of the pinion gear 32 and the engagement pin 16a of the spool shaft 16 compose the clutch mechanism 19 for connecting/disconnecting the rotational force between the handle 2 and the spool 15. In this case, when the pinion gear 32 is moved outward, and the engagement groove 32d and the engagement pin 16a are uncoupled, the clutch mechanism 19 will be in the clutch-off state. As a result, the rotational force from the handle shaft 30 is disconnected and thus, is not transmitted to the spool 16.

The level wind mechanism 24 includes a guiding pipe 25, a worm shaft 26 and a line guide 27. The guiding pipe 25 is fixed between the first and second side plates 8 and 9. The worm shaft 26 is rotatably supported in the guiding pipe 25. The worm shaft gear 28 is fixed to one end of the worm shaft 26. The worm shaft 26 has a spiral groove 26a formed at an outer periphery of the worm shaft 26. A portion of the line guide 27 is engaged with the spiral groove 26a. Accordingly, the line guide 27 is reciprocated along the guiding pipe 25 when the worm shaft 26 rotates via the rotation transmission mechanism 18.

Next, a detailed explanation will be made of the clutch operating member 17 and the clutch control mechanism 20 with reference to FIG. 4.

Figure 7:
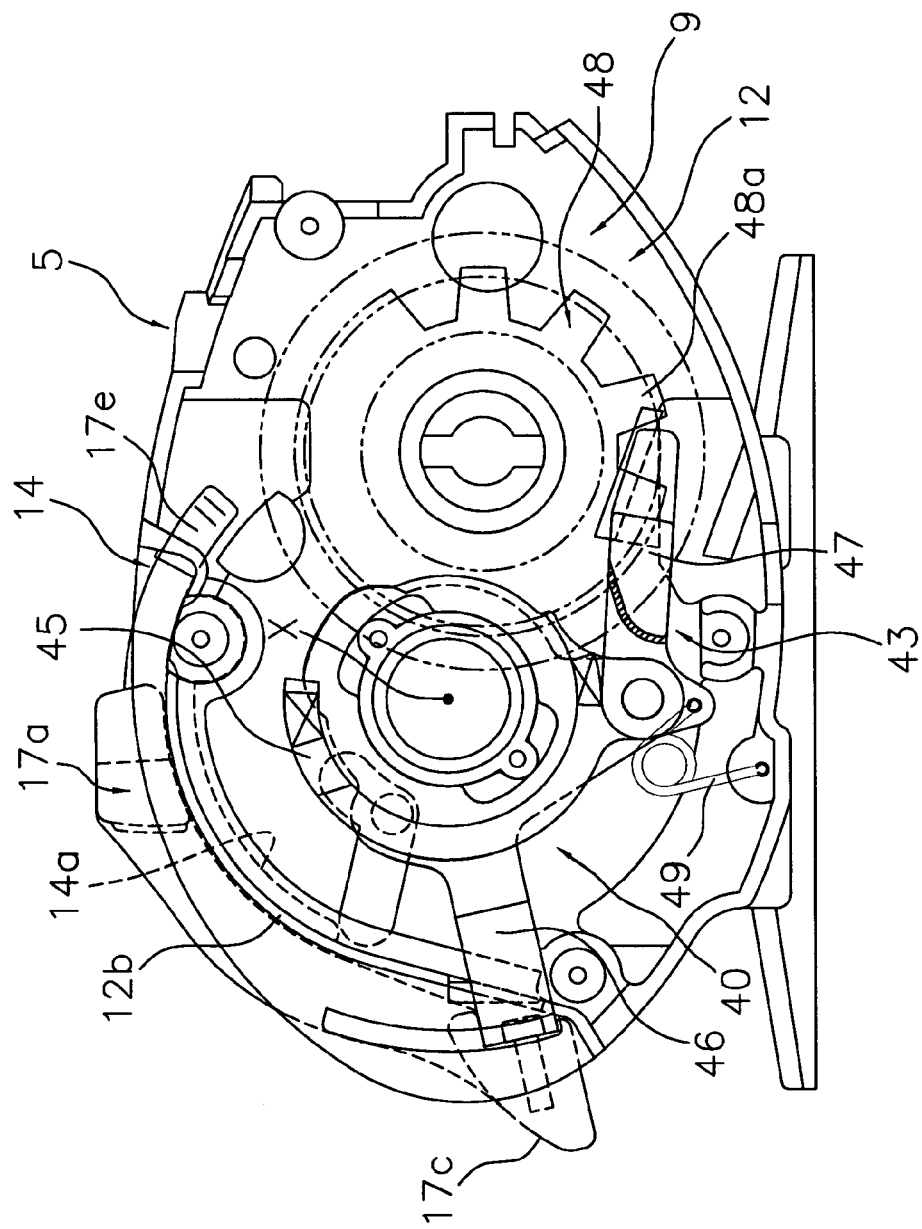
FIG. 7 is the second side view with the second side cover being removed and with the clutch in a clutch-off state in accordance with the first embodiment of the present invention.

The clutch operating member 17 is pivotably connected to the clutch control mechanism 20 between an engaged position, as shown in FIG. 6, and an uncoupled position, as shown in FIG. 7. Referring to FIG. 4, the clutch operating member 17 includes a first operating portion 17a, a second operating portion 17b and a third operating portion 17c. The first and second operating portions 17a and 17b are slidably attached to the attachment sections 13a and 14a of the first and second movement support portions 13 and 14, respectively. The third operating portion 17c is disposed at the back of the spool 15 such that there is a gap between the third operating portion 17c and the inside surface of each of the plate-shaped sections 13b and 14b of the first and second movement support portions 13 and 14. The first and second operating portions 17a and 17b are each integrally formed with an end of the third operating portion 17c. Thus, the clutch operating member 17 is substantially C-shaped as a whole.

The clutch operating member 17 further includes first and second rod-shaped outer portions 17d and 17e that are disposed at respective fore ends of the first and second operating portions 17a and 17b. The first and second outer portions 17d and 17e are curved into an arc shape. The first and second outer portions 17d and 17e pass through the openings 13e and 14e, respectively. The first and second outer portions 17d and 17e are arranged on respective outside surfaces of the first and second plate bodies 11 and 12. The first and second outer portions 17d and 17e are used such that a difference in level is not generated in the attachment sections 13a and 14a of the first and second movement support portions 13 and 14 when the clutch operating member 17 is pivoted in a clutch-off direction. In addition, the first operating portion 17a has a first push control portion 17f at the fore end of the first operating portion 17a. The second operating portion 17b has a second push control portion 17g at the fore end of the second operating portion 17b. The first and second push control portions 17f and 17g are formed to protrude inward so that they face each other in order to provide an easy pivot operation frontward of the reel unit 1.

Referring to FIG. 4, the clutch control mechanism 20 includes a clutch cam 40, a clutch yoke 41, a coil spring 42 and a clutch return mechanism 43. The clutch cam 40 pivots about a spool shaft center axis X by pivoting action of the clutch operating member 17. A part of the clutch cam 40 engages with the arc-shaped slit 13f of the first movement support portion 13. A part of the clutch cam 40 engages with the arc-shaped slit 14f of the second movement support portion 14. The clutch yoke 41 is pressed outward in the direction of the spool shaft 16 by the clutch cam 40. The coil spring 42 presses the clutch yoke 41 inward in the direction of the spool shaft 16. The clutch return mechanism 43 returns the clutch mechanism 19 in the clutch-off state to the clutch-on state in cooperation with the rotation of the handle 2 in a line-retrieving direction.

Referring to FIGS. 3 and 4, the clutch cam 40 includes a cam portion 45 and a clutch plate 46. The cam portion 45 has a cam surface that presses the clutch yoke 41 outward in the direction of the spool shaft 16. The cam portion 45 is pivotably mounted to the second side plate body 12 about the spool shaft 16. The cam portion 45 is made of a synthetic resin, for example. The clutch plate 46 is pivotably mounted to the second side plate body 12 so as to pivot in cooperation with the cam portion 45.

The cam portion 45 includes a cylindrical cam body section 45a, a protrusion section 45b, a cam surface 45c and an engagement convex section 45d. The cam body section 45a is pivotably mounted about the spool shaft 16 at a center of the cam body section 45a. The cam body section 45a is not movable in the axial direction. The protrusion section 45b protrudes radially outward from the cam body section 45a. The clutch return mechanism 43 is mounted to the protrusion section 45b. The cam surface 45c is concentrically arranged on one surface of the cam body section 45a with the spool shaft 16. As shown in FIG. 4, the engagement convex section 45d is formed on a back of the cam body section 45a. The engagement convex section 45d engages with an engagement hole 46c that is formed on the clutch plate 46. Thus, the pivoting of the clutch operating member 17 is transmitted to the cam portion 45. In addition, an engagement section (not shown) is formed in the clutch yoke 41. Engagement of the cam surface 45c with the engagement section presses the clutch yoke 41 outward in the direction of the spool shaft 16.

The clutch plate 46 includes an attachment portion 46a and an installation portion 46b. The attachment portion 46a is rotatably attached to the second side plate body 12. The installation portion 46b extends from the attachment portion 46a in the radial direction and then is bent to be substantially parallel to the spool shaft center axis X. The installation portion 46b penetrates the slits 13f and 14f formed in the plate-shaped sections 13b and 14b of the first and second movement support portions 13 and 14. The third operating portion 17c of the clutch operating member 17 is fastened with screws to the installation portion 46b between the first and second operating portions 17a and 17b.

As shown in FIG. 4, the clutch yoke 41 is disposed on the outer periphery of the spool shaft 16. The clutch yoke 41 is supported by two pins 44 such that the clutch yoke 41 is movable parallel to the center axis X of the spool shaft 16. The spool shaft 16 is able to rotate relative to the clutch yoke 41. In other words, when the spool shaft 16 rotates, the clutch yoke 41 does not rotate. In addition, the clutch yoke 41 includes an engagement portion 41a on the central portion thereof that engages with the constricted portion 32c of the pinion gear 32. Moreover, the coil springs 42 are disposed around the outer periphery of the two pins 44 that support the clutch yoke 41, between the clutch yoke 41 and the second side cover 6b. The clutch yoke 41 is biased inward of the spool shaft 16 by the coil springs 42.

With this configuration, in the ordinary state, the pinion gear 32 is positioned in an inward clutch-on position in a clutch-on state in which the engagement groove 32d of the engagement portion 32b and the engagement pin 16a of the spool shaft 16 are engaged. On the other hand, when the pinion gear 32 is pressed and moved outwardly by the clutch yoke 41, the engagement groove 32d is disengaged from the engagement pin 16a to be the clutch-off state.

As shown in FIGS. 4, 6 and 7, the clutch return mechanism 43 includes a disengagement member 47 and a ratchet wheel 48. The disengagement member 47 is pivotably mounted to the protrusion section 45b of the cam portion 45. The disengagement member 47 includes a pawl portion 47a that is configured to contact the outer periphery of the ratchet wheel 48. The pawl portion 47a is formed at an end of the disengagement member 47. The disengagement member 47 is biased in both pivot directions by a toggle spring 49.

Referring to FIGS. 6 and 7, the ratchet wheel 48 is non-rotatably mounted to the handle shaft 30. The ratchet wheel 48 has a plurality of teeth 48a spaced at intervals in the rotation direction on an outer periphery of the ratchet wheel 48. The teeth 48a press the pawl portion 47a of the disengagement member 47 and thus, return the clutch cam 40 from the clutch-off position to the clutch-on position.

Members that compose the clutch control mechanism 20, e.g., the cam portion 45 of the clutch cam 40, the clutch plate 46, the clutch yoke 41, the two pins 44, the disengagement member 47 of the clutch return mechanism 43 and the ratchet wheel 48 (examples of a second component body), are made of a stainless steel alloy. The surfaces of the members are subjected to various surface treatments.

Next, a detailed explanation will be made of the obverse structure of the parts composing the clutch control mechanism 20.

Figure 10:
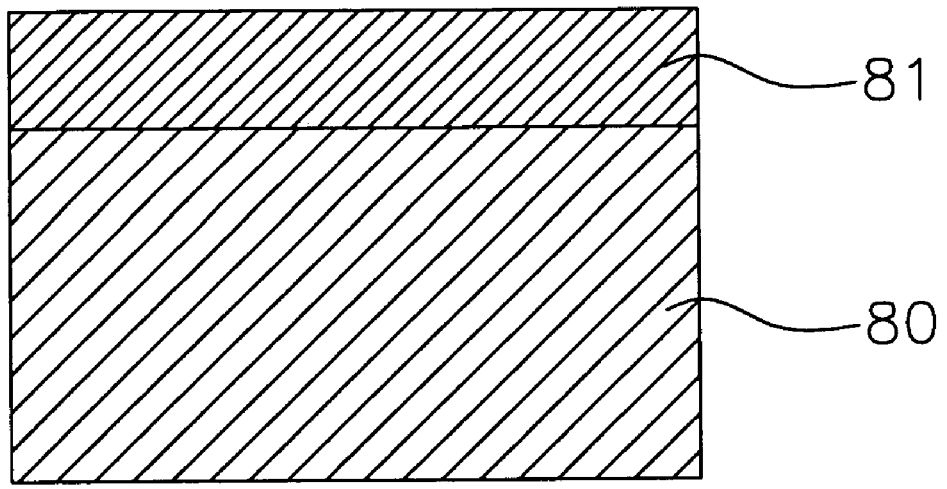
FIG. 10 is a schematic cross-sectional view of a second component body of the fishing component in accordance with the first embodiment of the present invention.
Figure 11:
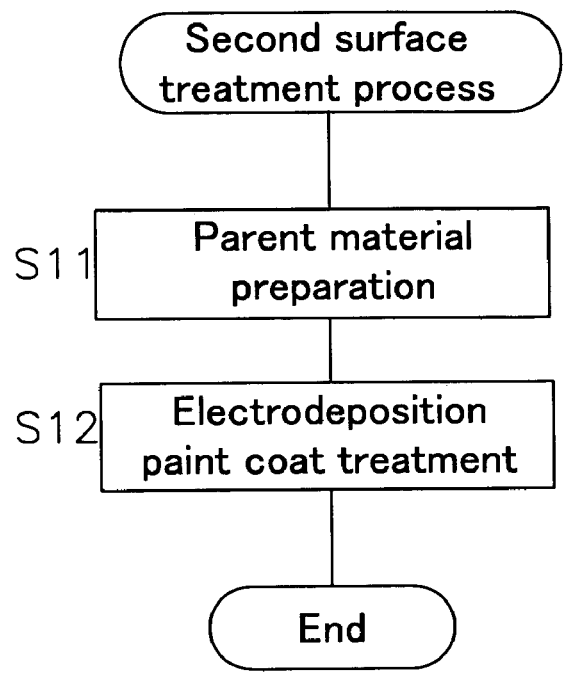
FIG. 11 is a diagram of surface treatment processes of the second component body of the fishing component of FIG. 10 in accordance with the first embodiment of the present invention.

As shown in FIGS. 10 and 11, a parent material that will become a second component body 80 made of stainless steel alloy in each of the members is prepared (S11 in FIG. 11). A second insulating film layer 81 is formed on a surface layer side of the second component body 80 by an electrodeposition paint coat treatment (S12 in FIG. 11).

The second insulating film layer 81 is formed by electrodeposition using a cationic electrodeposition paint with a main component of a polyamine resin. To carry out the electrodeposition, the second component body 80 is immersed in a bath of the electrodeposition paint and, taking the second component body 80 as the cathode and an electrode arranged in the bath of the electrodeposition paint as the anode, the second component body 80 is galvanically coated with the paint by applying a dc voltage. Since the second insulating film layer 81 is formed in this way by an electrodeposition paint coat method, it is possible to improve rust-preventive properties and to facilitate bonding the second insulating film layer 81 uniformly onto the surface of the second component body 80.

Next, a detailed explanation will be made of other mechanisms such as the drag mechanism 21.

As shown in FIG. 3, the drag mechanism 21 includes a friction plate 60 and a pressure plate 61. The friction plate 60 is pressed against the master gear 31. The pressure plate 61 is for pressing the friction plate 60 against the master gear 31 with a predetermined amount of force by rotating the star drag 3. In addition, the casting control mechanism 22 includes a plurality of plates 62 and 63 and a cap 64. The plates 62 and 63 are disposed so as to sandwich the spool shaft 16. The cap 64 serves to adjust the force with which the plates 62 and 63 are pressed against the spool shaft 16. Female threads are formed on an inner periphery of the cap 64 and mesh with male threads formed on the second side cover 6b.

The centrifugal braking mechanism 23 is disposed inside the brake case 65. The centrifugal braking mechanism 23 includes a cylindrical brake drum 66 and a plurality of brake shoes 67. The brake drum 66 is disposed inside the brake case 65. The brake shoes 67 are arranged so as to face the inner periphery side of the brake drum 66. The brake shoes 67 are arranged radially around a rotation member 68. The rotation member 68 is non-rotatably mounted to the spool shaft 16 and rotates together with the spool 15. The brake shoes 67 are movable in the radial direction.

Next, an explanation will be made of the operation of the dual bearing reel.

An ordinary state is shown on an upper side of the spool shaft center axis X in FIG. 3. Referring to FIGS. 3 and 4, in the ordinary state, the clutch yoke 41 is pressed inward of the spool shaft 16 by the coil spring 42. Thus, the pinion gear 32 is shifted to the engaged position. In this state, the engagement groove 32d of the pinion gear 32 and the engagement pin 16a of the spool shaft 16 are engaged in the clutch-on state, and rotational force from the handle 2 is transmitted to the spool shaft 16 and the spool 15 via the handle shaft 30, the master gear 31 and the pinion gear 32. In this case, by adjusting the amount by which the cap 64 is tightened, the resistance that occurs when the spool 15 rotates is selectively adjusted.

When casting is to occur, the clutch operating member 17 is pressed downward. Specifically, the inside of the thumb for thumbing the fishing line presses the third operating portion 17c. By pressing the third operating portion 17c, the clutch operating member 17 is pivoted downward about the spool shaft center axis X and is shifted to the uncoupled position. Since the clutch operating member 17 is connected to the clutch plate 46, by pivoting the clutch operating member 17 downward, the clutch plate 46 is pivoted counterclockwise in FIG. 6 about the spool shaft center axis X. Since the clutch plate 46 engages with the cam portion 45, when the clutch plate 46 pivots counterclockwise, the cam portion 45 also pivots counterclockwise about the spool shaft 16 against the spring force of the toggle spring 49. When the cam portion 45 pivots counterclockwise, since the engagement portion of the clutch yoke 41 is in contact with the cam surface 45c of the cam portion 45, the clutch yoke 41 is shifted axially outward of the spool shaft 16 (rightward in FIG. 3) along the cam surface 45c. Since the clutch yoke 41 engages with the constricted portion 32c of the pinion gear 32, when the clutch yoke 41 is shifted outward, the pinion gear 32 is shifted in the same direction. This state is shown on the lower side of the spool shaft center axis X in FIG. 3. In this state, the engagement groove 32d of the pinion gear 32 and the engagement pin 16a of the spool shaft 16 are disengaged in the clutch-off state. In this state, the rotation from the handle shaft 30 is not transmitted to the spool shaft 16 and the spool 15.

The clutch-off state is shown in FIG. 7. When the clutch plate 46 and the cam portion 45 are pivoted by shifting the clutch operating member 17 downward to the uncoupled position, the end of the disengagement member 47 on the front side is shifted toward the ratchet wheel 48.

In the case of quickly switching the clutch mechanism 19 from the clutch-on state back to the clutch-off state, the clutch operating member 17 is pivoted from the uncoupled position to the engaged position by pressing any of the push control portions 17f and 17g of the first and second operating portions 17a and 17b of the clutch operating member 17 with the fore end of the thumb when thumbing the fishing line. Thus, the clutch cam 40 pivots clockwise in FIG. 7 and returns to the engaged position shown in FIG. 6. As a result, the pinion gear 32 to which the clutch yoke 41 is biased by the coil spring 42 is shifted to the engaged position. Consequently, the engagement pin 16a engages with the engagement groove 32d of the pinion gear 32. Thus, the clutch mechanism 19 is switched into the clutch-on state. In addition, in the clutch-off state shown in FIG. 7, when the handle shaft 30 and the ratchet wheel 48 are rotated clockwise (in the line-retrieving direction) by the handle 2, the pawl portion 47*a* of the disengagement member 47 is pressed by the teeth 48*a* of the ratchet wheel 48. This causes the cam portion 45 to return to the engaged position. Thus, the clutch mechanism 19 is switched into the clutch-on state.

Since the first insulating film layer 72 is formed on the first component body 70 made of a magnesium alloy and the second insulating film layer 81 is formed on the second component body 80 made of a stainless steel alloy, even if the surface of the first insulating film layer 72 is scratched and the magnesium alloy is exposed on the surface layer side, the second insulating film layer 81 formed on the second component body 80 prevents exposure of the stainless steel on the surface layer side in contrast to the prior art. For this reason, even if a conducting liquid such as saltwater seeps between the first component body 70 and the second component body 80, no localized electric cell is formed between the magnesium alloy and the stainless alloy. Therefore, it is possible to reliably prevent galvanic corrosion on the first component body 70 made of magnesium alloy.

In the fishing component according to the present invention described above, the first and second component bodies 70 and 80 that compose a portion of the reel unit 1 and the clutch control mechanism 20, respectively, are used as examples of component bodies. However, it will be apparent to one of ordinary skill in the art from this disclosure that the present invention can be applied to any other fishing component having a first component body made of magnesium alloy and a second component body made of stainless steel alloy.

In the foregoing embodiment, an example is described in which the reel unit 1 of the dual bearing reel is not round. However, it will be apparent to one of ordinary skill in the art from this disclosure that the present invention can also be applied to a dual bearing reel in which the reel unit 1 is round.

Second Embodiment

Figure 12:
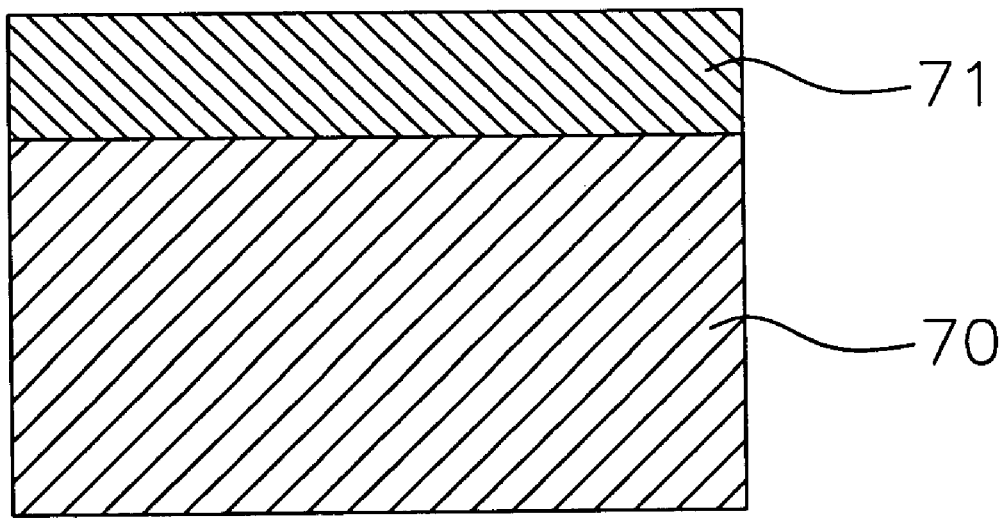
FIG. 12 is a schematic cross-sectional view of a first component body of a fishing component in accordance with a second embodiment of the present invention.
Figure 13:
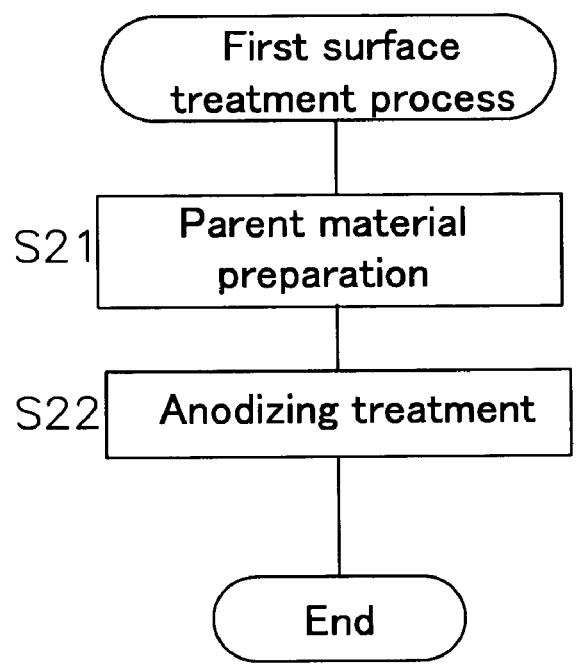
FIG. 13 is a diagram of surface treatment processes of the first component body of the fishing component of FIG. 12 in accordance with the second embodiment of the present invention.

Referring now to FIGS. 12 and 13, a fishing component in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the fishing component includes first and second component bodies 70 and 80 wherein the anodic oxide film layer 71 and the first insulating film layer 72 are formed on the first component body 70. The fishing component of the second embodiment includes the first and second component bodies 70 and 80. Referring to FIG. 13, the fishing component of the second embodiment is the same as the first embodiment except that only the anodic oxide film layer 71 is formed directly on the first component body 70. Referring to FIG. 13, the parent material that becomes the first component body 70 made of a magnesium alloy is prepared (S21). The anodic oxide film layer 71 is formed on a surface layer side of the first component body 70 by the anodizing treatment (S22) described in the first embodiment, for example.

Third Embodiment

Figure 14:
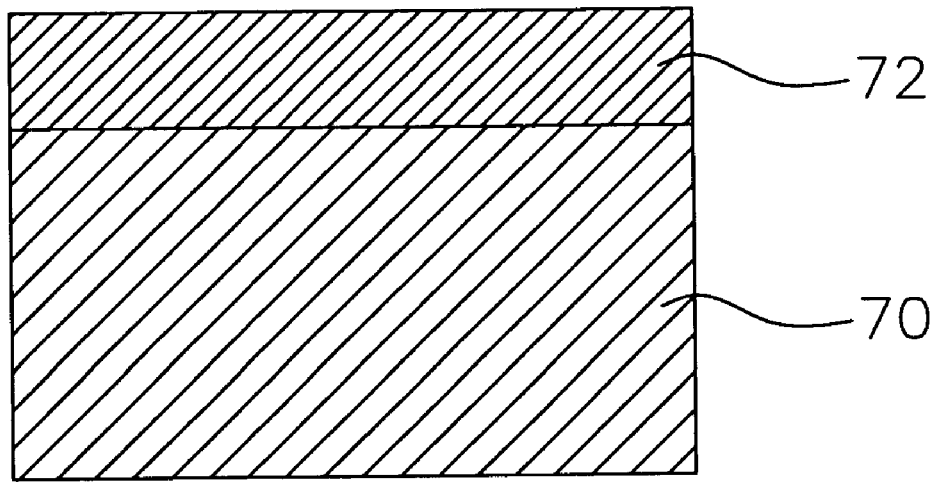
FIG. 14 is a schematic cross-sectional view of a second component body of a fishing component in accordance with a third embodiment of the present invention.
Figure 15:
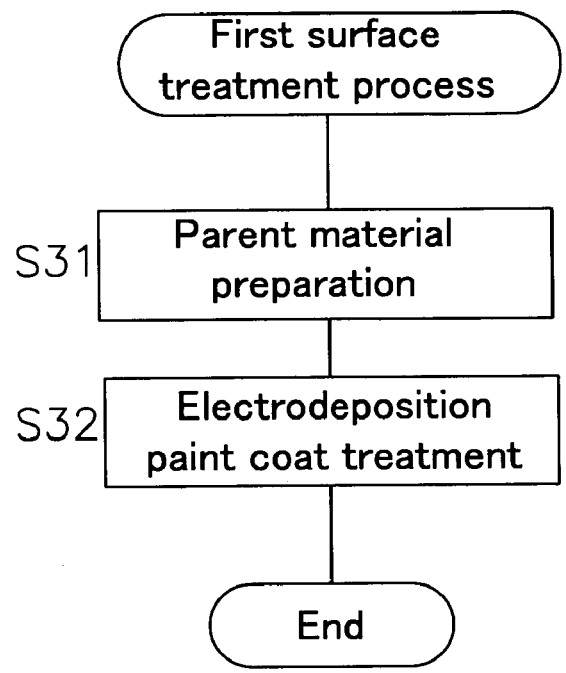
FIG. 15 is a diagram of surface treatment processes of the second component body of the fishing component of FIG. 14 in accordance with the third embodiment of the present invention.

Referring now to FIGS. 14 and 15, a fishing component in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the first embodiment, the fishing component includes first and second component bodies 70 and 80 wherein the anodic oxide film layer 71 and the first insulating film layer 72 are formed on the first component body 70. The fishing component of the third embodiment includes the first and second component bodies 70 and 80. Referring to FIG. 14, the third embodiment is the same as the first embodiment except that only the first insulating film layer 72 is formed directly on the first component body 70. Referring to FIG. 15, the parent material that becomes the first component body 70 made of a magnesium alloy is prepared (S31). The first insulating film layer 72 is formed on a surface layer side of the first component body by electrodeposition (S32) using a cationic electrodeposition paint as described in the first embodiment, for example.

Although the first and second insulating film layers 72 and 81 are formed by electrodeposition using a cationic electrodeposition paint in the above embodiments, it will be apparent to one of ordinary skill in the art from this disclosure that the materials and formation methods of the insulating film layers are not limited to the types disclosed herein. For example, the insulating film layers may be formed of paint film made from insulating paint.

The dual bearing reel in the above embodiments has been used as an example of a possible fishing reel in which the fishing component of the present invention can be utilized. It will be apparent to one of ordinary skill in the art from this disclosure that the fishing component of the present invention can be used in other fishing reels such as a spinning reel or any type of fishing reel where reliable prevention of corrosion is desired.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a fishing reel equipped with the present invention. Accordingly, these terms, as utilized to describe the present invention should be interpreted relative to a fishing reel equipped with the present invention as used in the normal operating position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fishing reel comprising:
   a reel unit;
   a spool rotatably disposed on the reel unit;
   a handle configured and arranged to rotate the spool; and
   a fishing component disposed at the reel unit and including
      a first component body made of a magnesium alloy, the first component body including an insulating film layer formed on the surface thereof, and
      a second component body made of a stainless steel alloy, and arranged proximate to the surface of the first component body, the second component body including an additional insulating film layer with corrosion resistant properties formed on the surface thereof so as to avoid the formation of a localized electric cell.

2. The fishing reel set forth in claim 1, further comprising:
   an anodic oxide film layer formed on the surface of the first component body.

3. The fishing reel set forth in claim 2, wherein
   the insulating film layer on the surface of the first component body is formed on the anodic oxide film layer.

4. The fishing reel set forth in claim 1, wherein the insulating film layer on the surface of the first component body is formed by electrodeposition.

5. The fishing reel set forth in claim 4, wherein the insulating film layer on the surface of the first component body includes a polyamide resin.

6. The fishing reel set forth in claim 1, wherein the second component body includes a clutch plate.

7. The fishing reel set forth in claim 1, wherein the first component body includes a frame.

8. The fishing reel set forth in claim 1, wherein the insulating film layer on the surface of the first component body includes a polyamide resin.

* * * * *